(12) United States Patent
Kim et al.

(10) Patent No.: US 7,113,343 B2
(45) Date of Patent: Sep. 26, 2006

(54) OPTICAL COMBINING DEVICE

(75) Inventors: Dae-sik Kim, Suwon-si (KR); Kun-ho Cho, Suwon-si (KR); Sung-ha Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/182,776

(22) Filed: Jul. 18, 2005

(65) Prior Publication Data

US 2005/0249098 A1 Nov. 10, 2005

Related U.S. Application Data

(62) Division of application No. 10/792,278, filed on Mar. 4, 2004.

(30) Foreign Application Priority Data

Mar. 6, 2003 (KR) .............................. 2003-14003

(51) Int. Cl.
*G02B 27/10* (2006.01)
*G03B 21/14* (2006.01)
(52) U.S. Cl. .......................... 359/638; 353/33; 353/20
(58) Field of Classification Search ................ 359/618, 359/831–837, 196
See application file for complete search history.

(56) References Cited

U.S. PATENT DOCUMENTS

| 4,170,401 | A | | 10/1979 | Yoder et al. |
|---|---|---|---|---|
| 5,612,753 | A | * | 3/1997 | Poradish et al. ............ 348/743 |
| 6,288,815 | B1 | | 9/2001 | Lambert |
| 2002/0191154 | A1 | | 12/2002 | Shahzad et al. |
| 2004/0196644 | A1 | | 10/2004 | Kim et al. |
| 2004/0233342 | A1 | * | 11/2004 | Kim et al. ..................... 349/6 |
| 2004/0233390 | A1 | | 11/2004 | Kim et al. |
| 2004/0246442 | A1 | | 12/2004 | Lee et al. |
| 2004/0246443 | A1 | | 12/2004 | Kim et al. |
| 2004/0246445 | A1 | | 12/2004 | Cho et al. |
| 2004/0246446 | A1 | | 12/2004 | Lee et al. |
| 2004/0246589 | A1 | * | 12/2004 | Kim et al. .................. 359/634 |
| 2004/0257387 | A1 | | 12/2004 | Kim et al. |
| 2004/0263789 | A1 | | 12/2004 | Kim et al. |

FOREIGN PATENT DOCUMENTS

JP 11-281930 A 10/1999
KR 1999-002347 A 1/1999

* cited by examiner

*Primary Examiner*—Mark A. Robinson
*Assistant Examiner*—Mark Consilvio
(74) *Attorney, Agent, or Firm*—Sughrue Mion, PLLC

(57) ABSTRACT

An optical combining device for combining the paths of two light beams having different polarizations is provided. The device includes a scroll direction change prism and a polarized beam splitter. The scroll direction change prism is disposed in the path of a first light beam and changes a scroll direction of the first light beam to as to be the same as that of a second light beam. The polarized beam splitter is disposed in the path of both the first light beam, reflected from the scroll direction change prism, and the second light beam and combines the first and second beams by selectively transmitting or reflecting them according to the polarization direction thereof.

2 Claims, 13 Drawing Sheets

OPTICAL COMBINING DEVICE

This is a divisional of Application No. 10/792,278 filed Mar. 4, 2004.

The entire disclosure of the prior application, application No. 10/792,278 is hereby incorporated by reference

BACKGROUND OF THE INVENTION

This application claims the priority of Korean Patent Application No. 2003-14003, filed on Mar. 6, 2003, in the Korean Intellectual Property Office, the disclosure of which is incorporated herein in its entirety by reference.

1. Field of the Invention

The present invention relates to an optical combining device which can improve the optical efficiency of an optical system and be made compact by combining light beams proceeding along different paths.

2. Description of the Related Art

In general, a projection system provides an image by projecting an image generated from a light valve, such as a liquid crystal display or a digital micromirror display, by using an additional light source onto a screen.

A projection system is classified into a single panel type and a three panel type according to the number of light valves. The single panel type can make the structure of a projection system smaller than the three panel type. However, since white light is separated into red, green, and blue (R, G, and B) colors in a sequential method, the optical efficiency is lowered to $\frac{1}{3}$ compared to the three panel type. Thus, the single panel type projection system requires improvement of the optical efficiency.

In a typical single panel projection optical system, light radiated from a white light source is separated into three colors of R, G, and B by using a color filter and the separated colors are sequentially transmitted to a light valve. The light valve is operated according to the order of the colors to represent an image. Since the colors are sequentially processed in the single panel type optical system, the optical efficiency is lowered to $\frac{1}{3}$ compared to a three panel type optical system. To solve the above problem, a scrolling method has been suggested. In a color scrolling method, white light is separated into three colors of R, G, and B and simultaneously the separated colors are transmitted to different positions of the light valve. Since an image is not represented until all the R, G, and B colors arrive for each pixel, each of color bars is moved at a particular speed in a special method.

As shown in FIG. 1, in a conventional single panel type projection system, white light which is not polarized is generated/radiated from a light source 11. The radiated white light passes through a fly eye lens array 13 which mixes incident light to make a uniform light beam so that the white light becomes a uniform light beam and proceeds to a polarization changer 15. The polarization changer 15 changes the polarization direction of the light beam so that the non-polarized white light radiated from the light source 11 becomes a white beam polarized in one direction. The white beam passed through the polarization changer 15 is split by first and second dichromatic mirrors 17 and 19 into red, blue, and green colors. That is, the first dichromatic mirror 17 reflects light having a blue wavelength among the white beam incident on the first dichromatic mirror 17 and transmits light having other wavelengths. The light passed through the first dichromatic mirror 17 is split by the second dichromatic mirror 19 into green and red light beams.

First through third scanning prisms 21, 23, and 25, for periodically scrolling an incident light beam, are arranged on an optical path of each split color. The first through third scanning prisms 21, 23, and 25 each are prisms having a rectangular block shape and rotated by a driving source (not shown). As the angle made between the optical axis and the side surface of the prism changes on the optical path by the rotation of each of the first through third scanning prisms 21, 23, and 25, the proceeding path of the light beam passed through these prisms are changed periodically.

The initial angle of each prism is set such that, when the first through third scanning prisms 21, 23, and 25 are rotated on the optical path, the light beams passed through the respective first through third scanning prisms 21, 23, and 25 divide an effective image area of a light valve 33 into three sections. Accordingly, as shown in FIG. 2, according to the driving state of the first through third scanning prisms 21, 23, and 25, color bars are formed in the effective image area of the light valve 33 by repeating the order of (B, R, G)→(G, B, R)→(R, G, B).

The light beams passed through the first through third scanning prisms 21, 23, and 25 are combined by third and fourth dichromatic mirrors 27 and 29. Reflection mirrors 18 and 20 are arranged between the first dichromatic mirror 17 and the third dichromatic mirror 27 and between the second dichromatic mirror 19 and the fourth dichromatic mirror 29, respectively, so as to change the proceeding paths of the light beams.

The scrolled light beams passed through the fourth dichromatic mirror 29 are incident on a polarized beam splitter 31 which transmits or reflects the incident light beam according to the polarization direction thereof. The light beam reflected by the polarized beam splitter 31 is incident on the light valve 33 while the color bars are periodically scrolled as shown in FIG. 2. The light valve 33 generates an image from the incident light. The image is generated by making the polarization direction of an exit light beam different in units of pixels. This light beam having a polarization direction different from that of the incident light beam is transmitted through the polarized beam splitter 31 to proceed toward a projection lens unit 35. The projection lens unit 35 magnifies the input image and projects the magnified image onto a screen 50.

The above-described projection device includes a plurality of relay lenses 41, 42, 43, 44, 45, 46, 47, 48, and 49 on the optical axis to transmit the light radiated from the light source 11 to the light valve 33.

To represent a color image by using the scrolling method, the color bars need to be moved at a constant speed as shown in FIG. 2. In the conventional structure, however, since the light valve and the three scanning prisms are synchronized for scrolling, the control of synchronization is difficult. In addition, since the scanning prisms 21, 23, and 25 perform circular motions, the speed of the color scrolling is not constant so that the quality of an image can be deteriorated.

SUMMARY OF THE INVENTION

To solve the above and other problems, the present invention provides an optical combining device which combines light beams scrolled in two different areas and proceeding on different optical paths to enhance the optical efficiency.

According to an aspect of the present invention, an optical combining device to make light beams having different polarization directions and proceeding along different paths proceed along the same path comprises a scroll direction change prism. The scroll direction change prism is arranged on a proceeding path of a first light beam of the light beams proceeding along different paths and changes a scroll direction of the first light beam so as to be the same as that of a second light beam proceeding along a different path. The optical combining device also comprises a polarized beam splitter which is provided on a proceeding path of the second light beam having a different polarization from that of the first light beam and which makes the first and second light beams proceed along the same path by selectively transmitting or reflecting an incident light beam according to the polarization direction thereof.

The scroll direction change prism comprises a first reflection surface, which receives and reflects the first light beam, and a second reflection surface, which makes a right angle with the first reflection surface and which reflects an image of the first light beam reflected by the first reflection surface reversely to proceed toward the polarized beam splitter.

According to another aspect of the present invention, an optical combining device comprises a scroll direction change prism, which is arranged on a proceeding path of a first light beam of light beams transmitting different effective areas of a spiral lens disc and which changes a scroll direction of the first light beam so as to be the same as that of a second light beam transmitting the other effective area. The optical combining device also comprises a beam shifter, which is arranged on a proceeding path of the second light beam and which shifts the second light beam so as to be combined with the first light beam exit from the scroll direction change prism.

The scroll direction change prism comprises a first reflection surface, which receives and reflects the first light beam, a second reflection surface which makes a right angel with the first reflection surface and which reflects an image of the light beam reflected by the first reflection surface reversely, and a third reflection surface, which reflects the light beam reflected by the second reflection surface in a direction parallel to the second light beam exit from the beam shifter.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
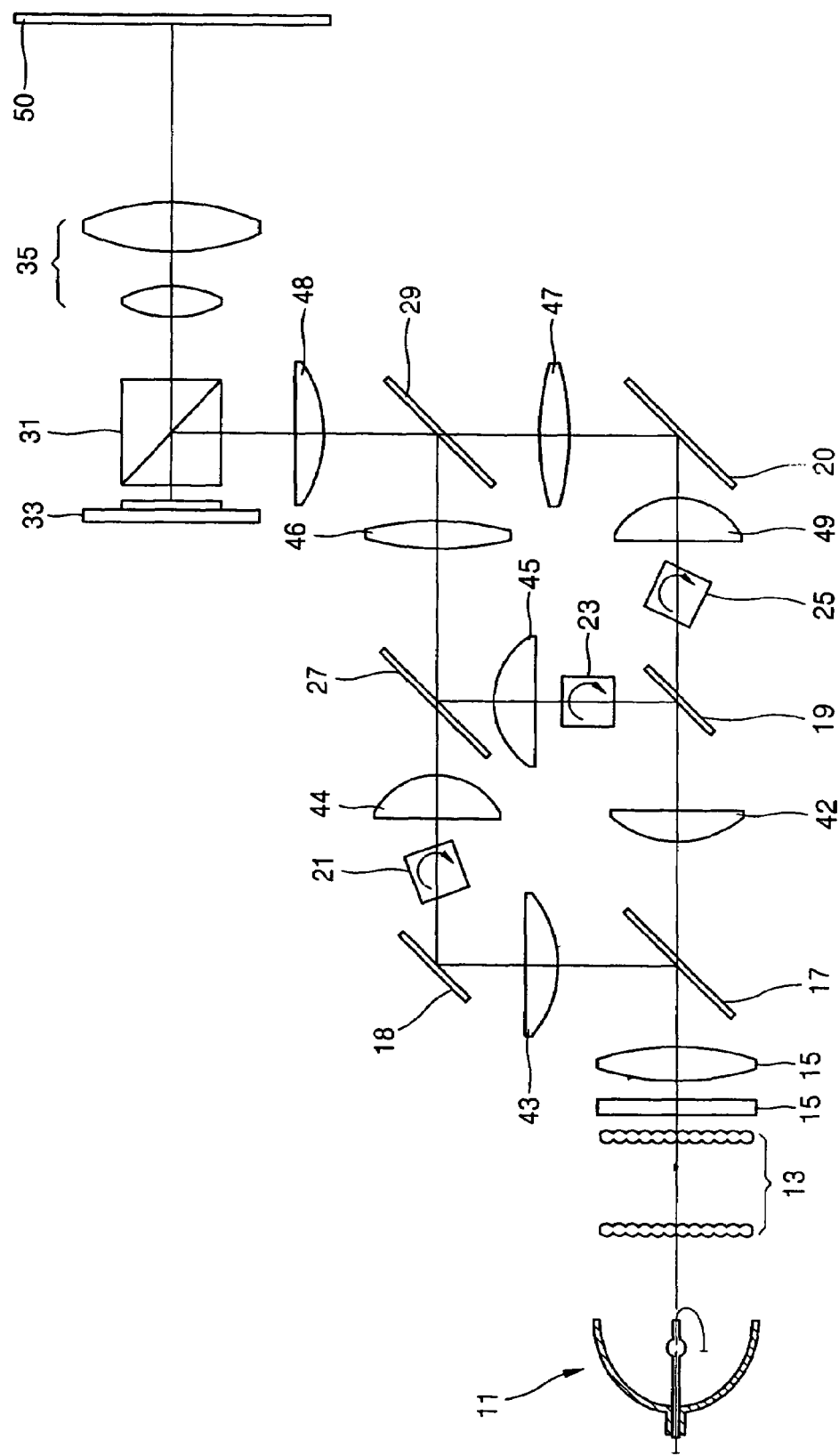
FIG. 1 is a view illustrating the optical configuration of the conventional single panel type projection system.
Figure 2:
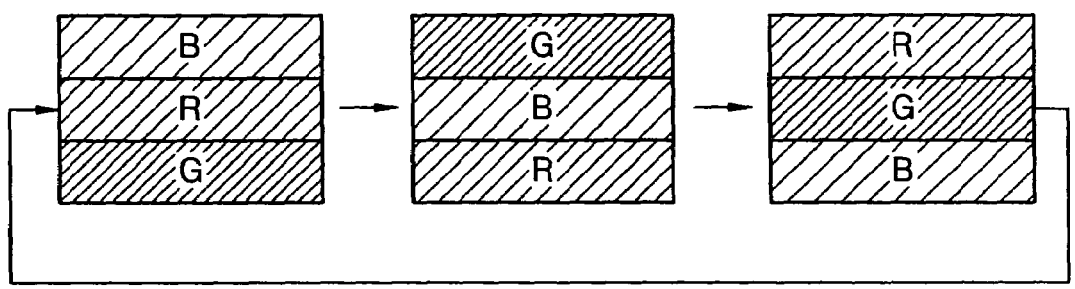
FIG. 2 is a view illustrating the operation of the color scroll in the projection system of FIG. 1.
Figure 3:
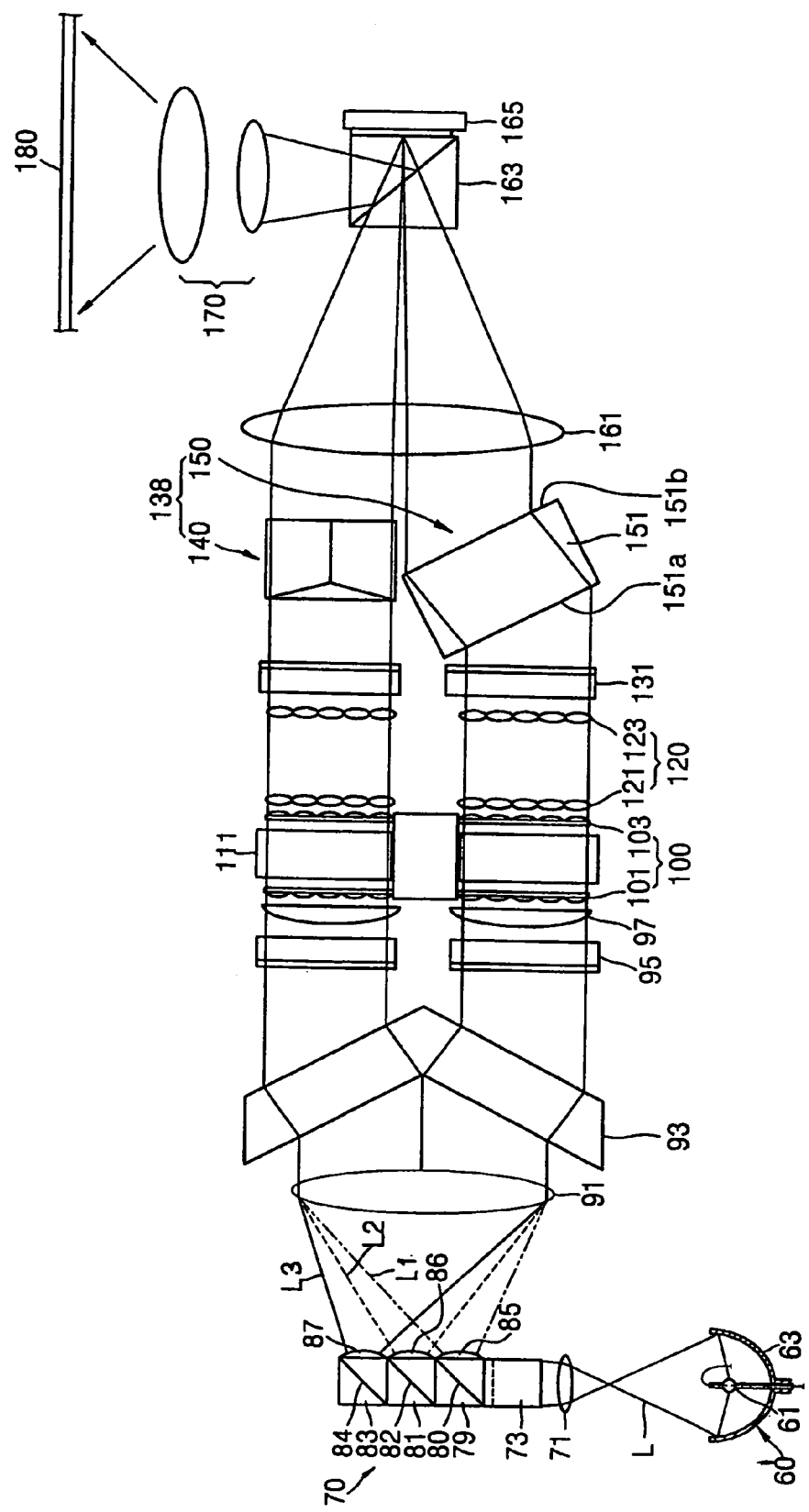
FIG. 3 is a view illustrating the optical configuration of a projection system adopting an optical combining device according to a first exemplary embodiment of the present invention.

Referring to FIG. 3, a projection system adopting an optical combining device according to a first exemplary embodiment of the present invention includes a light source 60, a color filter 70 to separate a light beam radiated from the light source 60 according to a predetermined wavelength range, a spiral lens disc unit 100 to periodically scroll a proceeding path of each of the light beams separated by the color filter 70, and a beam splitter 93 to magnify and split an incident light beam.

The light source 60 generates and radiates white light and includes a lamp 61 to generate light and a reflection mirror 63 to reflect the light radiated from the lamp 61 and guide the reflected light along a proceeding path thereof. The reflection mirror 63 may be an oval mirror or a parabolic mirror. The oval mirror has one focal point at the position of the lamp 61 and the other focal point at a position where light is focused. The parabolic mirror makes the light radiated from the lamp 61 and reflected by the reflection mirror 63 a parallel beam. In FIG. 3, an oval mirror is employed as the reflection mirror 63.

The color filter 70 separates the incident light according to a predetermined wavelength range and makes the separated light beams proceed at different angles. Thus, the color filter 70 prevents the incident light which is input at a predetermined angle from being output in a direction other than a desired direction so that an efficiency in use of light is improved. That is, an effect by a change in a value of etendue which signifies a physical amount of optical conservation in an optical system can be reduced.

Figure 4:
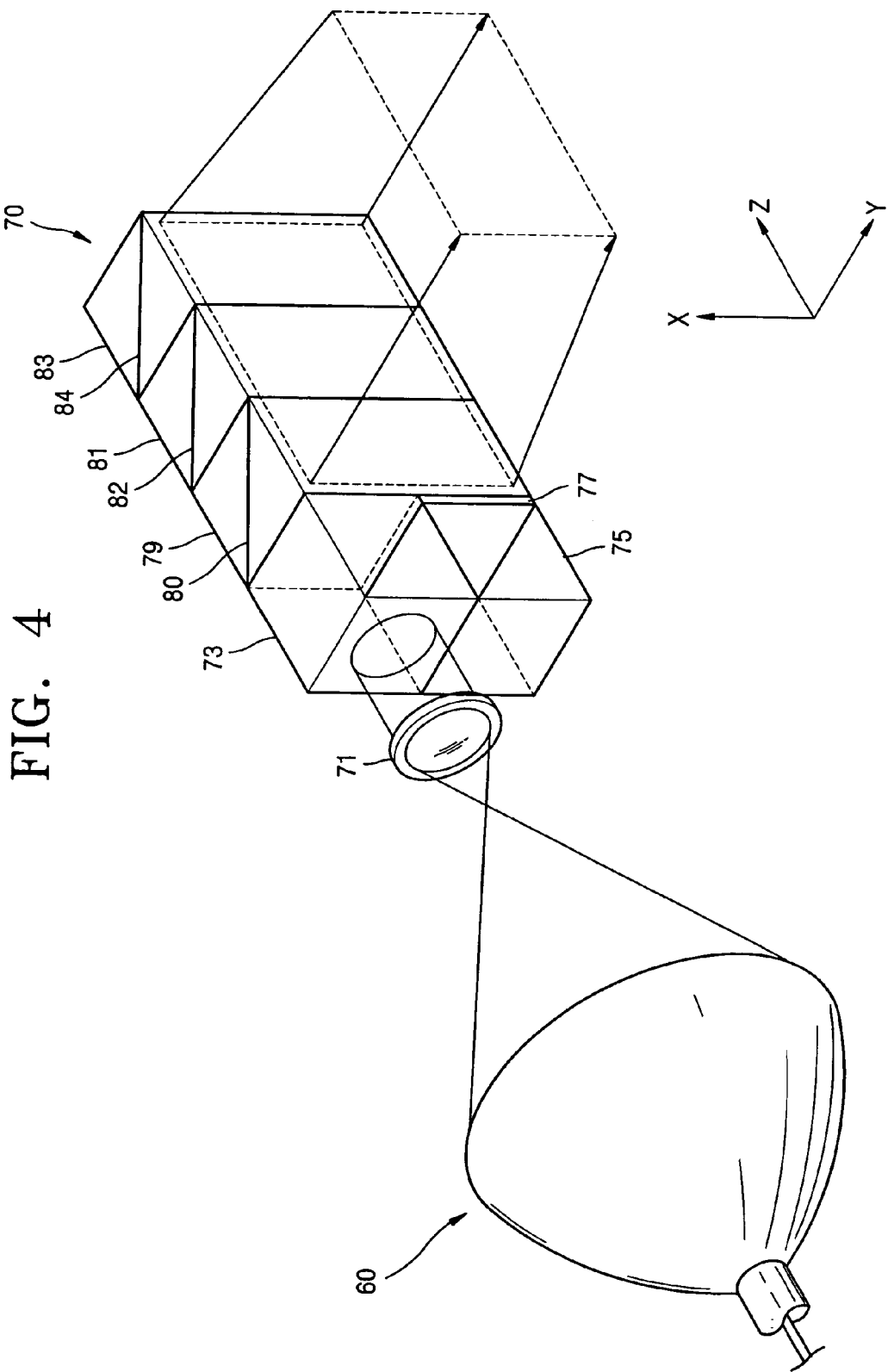
FIG. 4 is a perspective view illustrating the optical arrangement of the light source and the color filter of FIG. 3.
Figure 5:
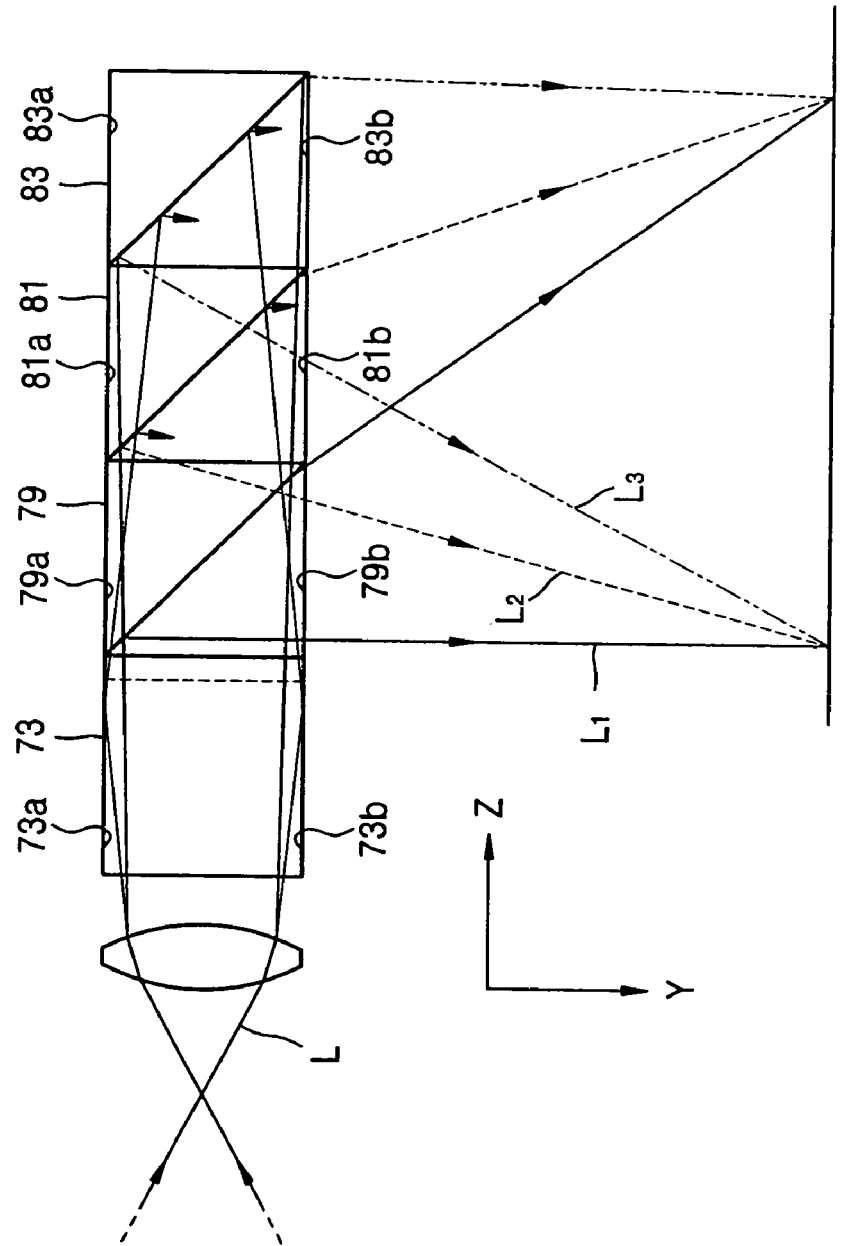
FIG. 5 is a plan view illustrating the color filter of FIG. 4.
Figure 6:
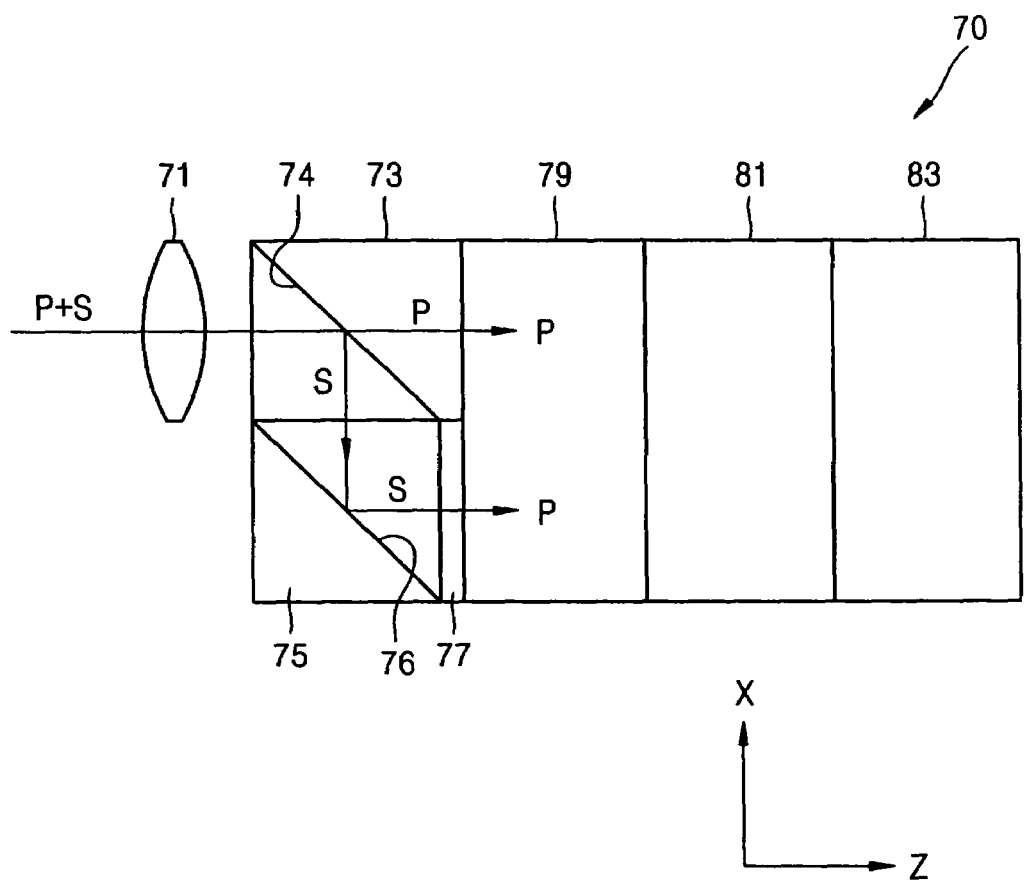
FIG. 6 is a front view illustrating the color filter of FIG. 4.

To this end, the color filter 70, as shown in FIGS. 4 through 6, includes first, second, and third dichromatic prisms 79, 81, and 83 to separate an incident light beam L into first, second, and third color light beams L1, L2, and L3 by reflecting light in a particular wavelength range and transmitting light in other wavelength range.

The first dichromatic prism 79 has a first mirror surface 80 arranged inclined to an optical axis of the incident light beam L. The first mirror surface 80 reflects the first color light beam L1 and transmits the second and third color light beams L2 and L3 of the incident light beam L. For example, the first mirror surface 80 reflects a light beam having a blue (B) wavelength and transmits light beams having different wavelengths. The first dichromatic prism 79 has first reflection surfaces 79a and 79b (refer to FIG. 5) constituting an outer shape thereof and reflecting the incident light beam at a predetermined angle, inside the first dichromatic prism 79. In detail, the first reflection surfaces 79a and 79b totally reflect an incident light beam input at an angle greater than a predetermined angle, that is, a critical angle. Therefore, an efficiency in use of the incident light beam L can be improved.

The second dichromatic prism 81 is arranged close to the first dichromatic prism 79 and has a second mirror surface 82 arranged inclined to the optical axis of the incident light beam L. The second mirror surface 82 reflects the second color light beam L2, for example, a light beam having a red (R) wavelength, and transmits light beams having different wavelengths.

The third dichromatic prism 83 is arranged close to the second dichromatic prism 81 and has a third mirror surface 84 arranged inclined to the optical axis of the incident light beam L. The third mirror surface 84 reflects the third color light beam L3, for example, a light beam having a green (G) wavelength. The third mirror surface 83 can be replaced with a total reflection mirror so as to reflect all the incident light beam.

The second and third dichromatic prisms 81 and 83 include the second and third reflection surfaces 81a and 81b, and 83a and 83b, respectively. Since the second and third reflection surfaces 81a and 81b, and 83a and 83b have the same functions as those of the first reflection surfaces 79a and 79b, detailed descriptions thereof will be omitted herein.

The color filter 70 having the above structure is suitable for a projection system using a micromirror device as a light valve to form an image regardless of the polarization property of the incident light.

The color filter 70 preferably, but not necessarily, further includes a first collimating lens 71 to make the incident light a parallel beam at a position corresponding to a light incident surface of the first dichromatic prism 79.

The color filter 70 preferably, but not necessarily, further includes first through third relay lenses 85, 86, and 87 arranged corresponding to the respective light exit surfaces of the first through third dichromatic prisms 79, 81, and 83. The first through third relay senses 85, 86, and 87 focus the first through third color light beams L1, L2, and L3 to have predetermined divergent angles.

The color filter 70 preferably, but not necessarily, further includes first and third polarized beam splitters 73 and 75 and a ½ wave plate 77 disposed on an optical path between the first collimating lens 71 and the first dichromatic prism 79.

The first polarized beam splitter 73 is provided at the light incident surface of the first dichromatic prism 79. The first polarized beam splitter 73 transmits a first light beam having one polarization of the incident non-polarized white light to proceed toward the first dichromatic prism 79 and reflects a second light beam having other polarization to proceed toward the second polarized beam splitter 75. To this end, the first polarized beam splitter 73 has a first polarization surface 74.

FIG. 6 shows that, when a white light beam in which a P polarization and an S polarization are mixed is radiated from the light source 60, the first polarization surface 74 transmits a light beam having the P polarization while reflecting a light beam having the S polarization.

The second polarized beam splitter 75 reflects a second light beam reflected by the first polarized beam splitter 73 to proceed toward the first dichromatic prism 79. Referring to FIG. 6, for example, the second polarized beam splitter 75 changes only a path of the S-polarized light beam without changing the polarization property thereof such that the S-polarized light beam can proceed parallel to the first light beam having been transmitted through the first polarized beam splitter 73. To this end, the second polarized beam splitter 75 has a second polarization surface 76 which reflects a light beam having a particular polarization of the incident light, for example, the S-polarized light beam. The second polarized beam splitter 75 can be a total reflection mirror which totally reflects the incident light.

The ½ wave plate 77 changes the phase of an incident light beam having a predetermined polarization by 180°.

FIGS. 3 through 6 show an example in which the ½ wave plate 77 is arranged between the second polarized beam splitter 75 and the first dichromatic prism 73 to change the polarization direction of the second light beam to be the same as that of the first light beam. That is, the S-polarized light beam reflected by the second polarization surface 76 is changed to be the same as the P-polarized light beam which is the same as the polarization direction of the first light beam. Alternatively, the ½ wave plate 77 can be arranged between the first polarized beam splitter 73 and the first dichromatic prism 79 to change the polarization direction of the first light beam to be the same as that of the second light beam.

Thus, the color filter 70 further including the first and second polarized beam splitters 73 and 75 can be used for a case in which an LCD is adopted as the light valve.

In the above color filter, the first through third dichromatic prisms 79, 81, and 83 can be changed by those having a feature of transmitting a particular color light beam and reflecting other color light beams and the optical arrangement thereof are changed suitable for the purpose. Since the manufacturing process of the first through third dichromatic prisms 79, 70, and 83 is widely known in the field of optical application technology, a detailed description thereof will be omitted herein.

As shown in FIG. 3, a second collimating lens 91 to focus the first through third color light beams L1, L2, and L3 which exit from the color filter 70 may be further provided on the optical path between the color filter 70 and the beam splitter 91.

The beam splitter 93 is arranged on the optical path between the second collimating lens 91 and the spiral lens disc unit 100 and split the light beams, into at least two parts, which are separated into different color light beams by the color filter 70 according to a predetermined wavelength thereof and proceeding at different angles. That is, the beam splitter 93 magnifies and separates the incident light beam to proceed toward at least two effective areas of a spiral lens disc 101.

Figure 7:
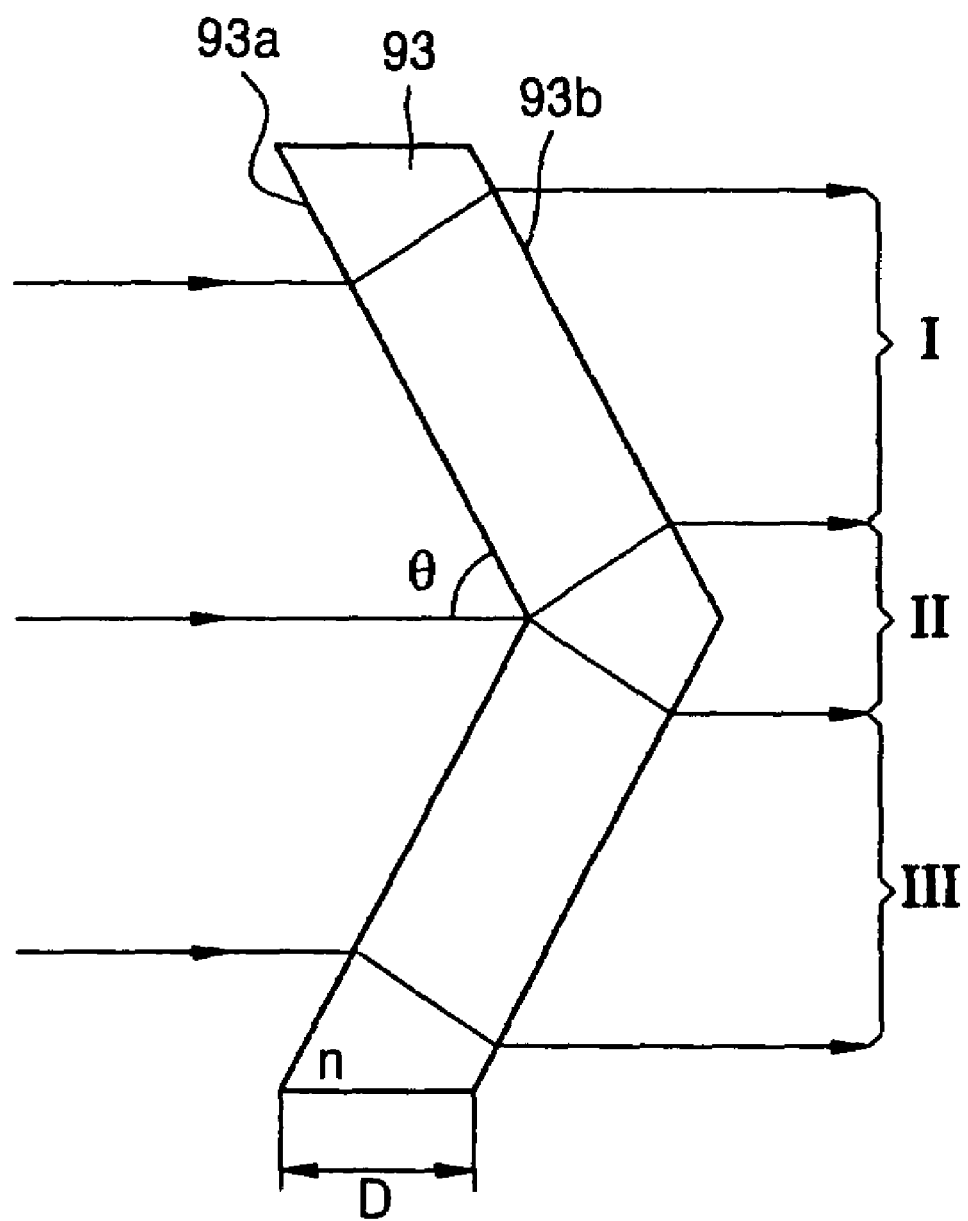
FIG. 7 is a view illustrating the optical operation of the beam splitter of FIG. 3.

Referring to FIG. 7, the beam splitter 93 has an incident surface 93a and an exit surface 93b which have a ">" shaped section. The incident surface 93a splits the incident light beam into at least two parts by refracting each of the first through third color light beams L1, L2, and L3 in a direction far from the optical axis. The exit surface 93b refracts the respective color light beams which are refracted at the incident surface 93a in a direction of the optical axis so as to be parallel to the incident light beam. The beam split by refraction is due to a difference in the refractive index between the beam splitter 93 and the air and the geometrical arrangement.

Thus, by appropriately setting a refractive index n of the beam splitter 93, an inclination angle θ of the incident surface 93a and the exit surface 93b, and a thickness D between the incident surface 93a and the exit surface 93b, all light beams can pass through first and third areas I and III corresponding to first and second effective areas A and B of FIG. 8 which are described later while a light beam is not incident on a second area II corresponding to a driving source 105 of FIG. 9. Accordingly, by splitting the light beam using the beam splitter 91, the effective light amount is increased and the first and second effective areas A and B of the spiral lens disc unit 100 can be utilized.

A plurality of cylindrical lenses 95 and 97 to shape the proceeding light beams are arranged on the optical axes of the light beams split into two areas I and III by the beam splitter. Each of the cylindrical lenses 95 and 97 correct the shape of the light beam by focusing the incident light beam in one direction and by linearly transmitting the incident light beam in the other direction, so as to shape the first and second effective areas A and B as indicated by a dotted line in FIG. 8.

Figure 8:
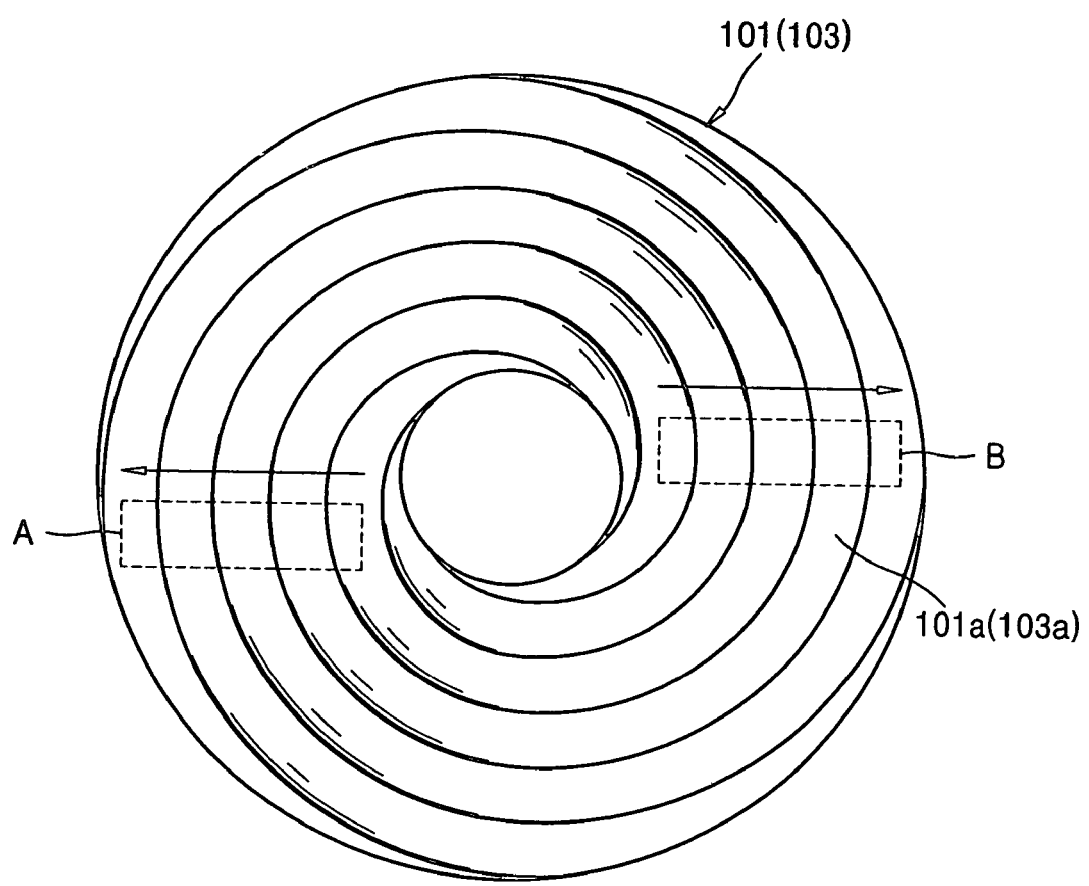
FIG. 8 is a front view illustrating the spiral lens of FIG. 3.
Figure 9:
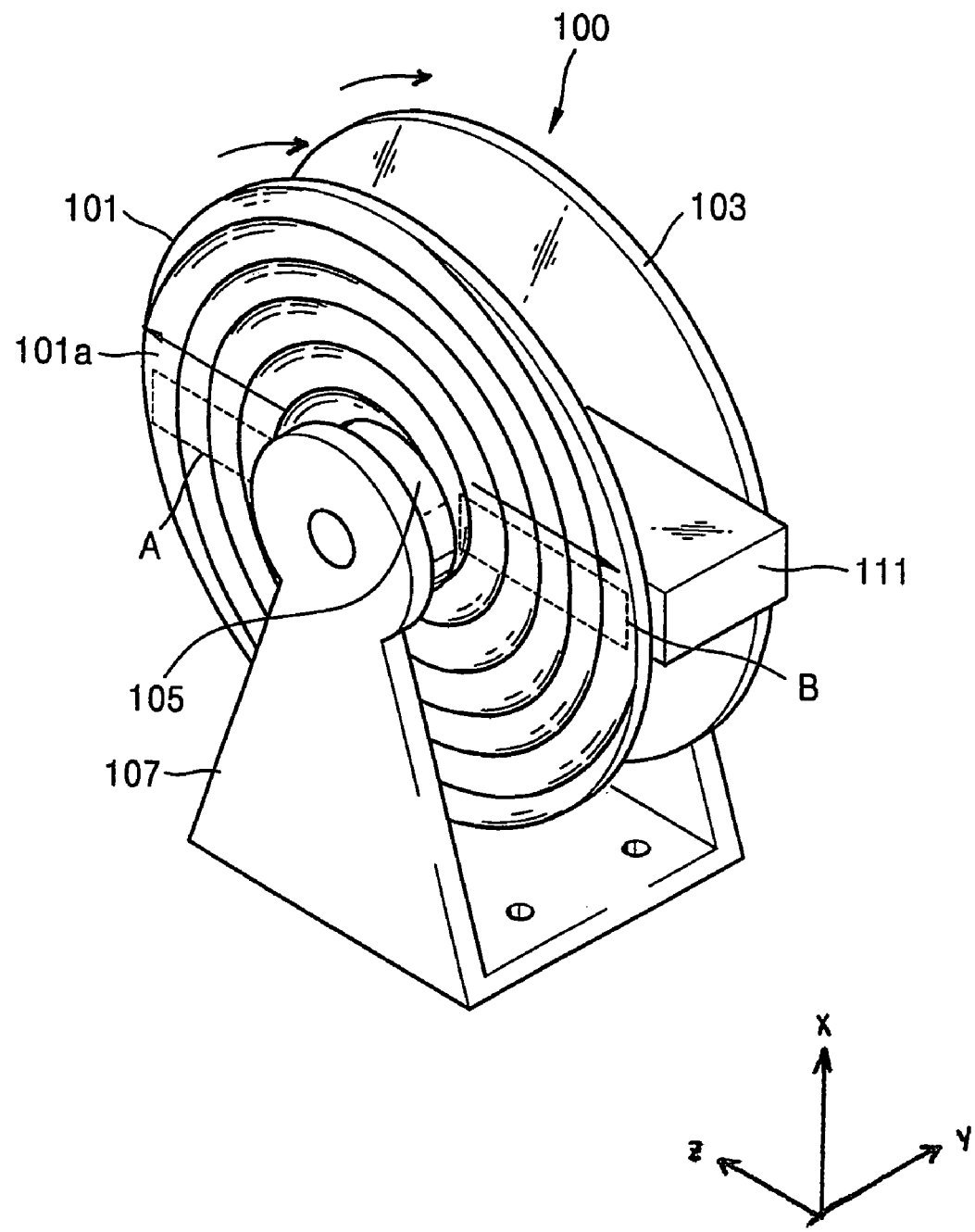
FIG. 9 is a perspective view illustrating the spiral lens disc unit of FIG. 3.

Referring to FIGS. 8 and 9, the spiral lens disc unit 100 includes first and second spiral lens discs 101 and 103 which are rotatable and supported at a bracket 107, a glass rod 111 arranged on the optical path between the first and second spiral lens discs 101 and 103, and a driving portion 105 which rotates the first and second spiral lens discs 101 and 103.

At least one cylindrical lens cell 101a and 103a is spirally arranged at least one surface of each of the first and second spiral lens discs 101 and 103. The spiral lens discs 101 and 103, while rotating, change the proceeding path of each of the light beams separated by the color filter 70 and periodically scroll the separated light beam. The scroll operation of the spiral lens discs 101 and 103 are described in detail with an exemplary case in which the first and second spiral lens discs 101 and 103 rotate clockwise at a predetermined speed.

Each color light beam separated by the color filter 70 passes through the cylindrical lenses 95 and 97 to be shaped and passes through the first and second effective areas A and B. Each cylindrical lens cell 101a appears to be the same as a plurality of cylindrical lenses arranged linearly neighboring one another in view of the first effective area A. An effect that the cylindrical lenses are moved in a direction from the inner circumference to the outer circumference can be obtained. Thus, the color light beam incident on the first effective area A is scrolled from the inner circumference of the disc to the outer circumference thereof. A color light beam incident on the second effective area B is scrolled by the same principle. However, the scroll directions of the light beams in the first and second effective areas A and B are opposite to each other.

The spiral lens disc unit 100 includes two discs: the first spiral lens disc 101 scrolling an incident light beam and a second spiral lens disc 103 arranged separated a predetermined distance from the first spiral lens disc 101 and correcting a divergent angle of each of the light beams exit from the first spiral lens disc 101.

The glass rod 111 transfers the light beam exit from the first spiral lens disc 101 to the second spiral lens disc 103 as it is. Also, considering the shape and the focal position of the color bar, a fly eye lens array 120, a cylindrical lens 131, and a fourth relay lens 161 are further provided.

The fly eye lens array 120 is arranged on an optical path of a light beam exit from the second spiral lens disc 103 and forms the color bar by making the light beam passed through the spiral lens disc unit 100 focused in different areas for each color. To this end, the fly eye lens array 120 includes a first fly eye lens 121 having a plurality of convex portions formed in a two-dimensional array on an incident surface and/or an exit surface, and a second fly eye lens 123 arranged neighboring to the first fly eye lens 121 and having a plurality of convex portions formed in a two-dimensional array on an incident surface and/or an exit surface. The first fly eye lens 25 is preferably, but not necessarily disposed at a focal surface of the second spiral lens disc 103. Also, the convex portions of each of the first and second fly eye lenses 121 and 123 are formed to match one-to-one with respect to the at least one cylindrical lens cell 101a of the first and second spiral lens discs 101 and 103 in the first and second effective areas A and B. Thus, each of the color light beams scrolled by the spiral lens disc unit 100 are transmitted by the first and second fly eye lens arrays 121 and 123 and are focused at different positions for each color so that the color bar for each color is formed.

The cylindrical lens 131 shapes the first through third color light beams separated for each color on the optical paths of the color light beams which have passed through the first and second effective areas A and B and exit from the second fly eye lens 123.

An optical combining device 138 according to a first exemplary embodiment of the present invention includes a scroll direction change prism 140 to change the scroll direction so that the scroll directions of the light beams passed through the first and second effective areas A and B are the same, and a beam shifter 150 to combine the light beams split by the beam splitter 93 by shifting the same.

The scroll direction change prism 140 is arranged on the optical path of the light beams passed through one of the first and second effective areas A and B of the spiral lens disc unit 100 to change the scroll direction. To this end, the scroll direction change prism 140 preferably has the shape of an Amici prism or penta prism.

Figure 10:
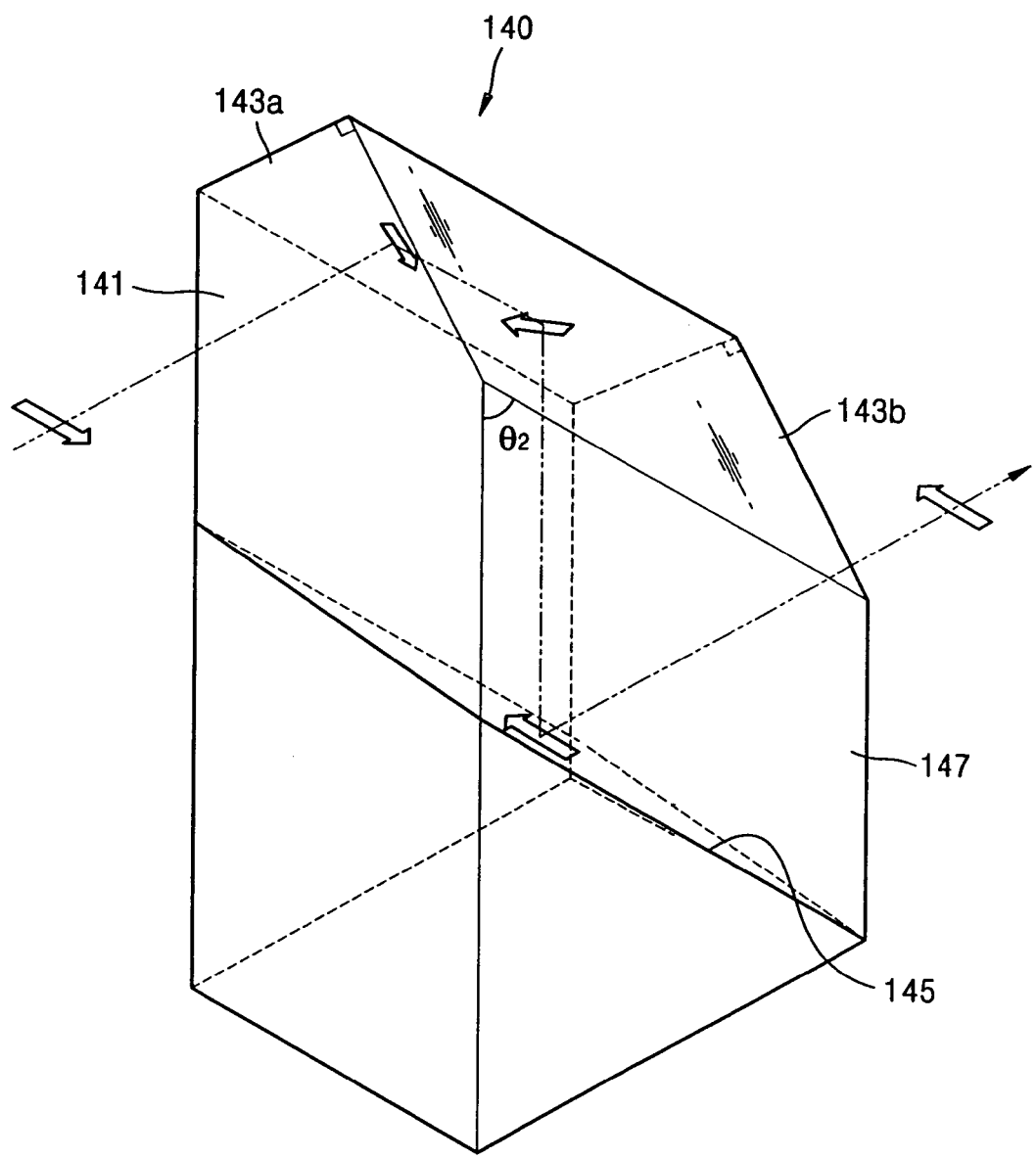
FIG. 10 is a perspective view illustrating an Amici prism used for the optical combining device of FIG. 3.

Referring to FIG. 10, the scroll direction change prism 140 includes an incident surface 141 and an exit surface 147 through which the light beams passed through one of the first and second effective areas A and B, first and second reflection surfaces 143a and 143b arranged perpendicularly to each other and inclined by an angle θ2 from the incident surface 141 toward the exit surface 147, and a third reflection surface 145 to reflect the light beam reflected by the first and second reflection surfaces 143a and 143b to proceed toward the exit surface 147. Thus, when a light beam having a scroll direction indicated by an arrow in FIG. 10 is incident on the incident surface 141, the vertical direction of the incident light beam is not changed and the light beam proceeds toward the second reflection surface 143b by being inclined by the angle θ2. As a result, the scroll direction of the light beam is changed to the opposite at the second reflection surface 143b. Likewise, the light beam incident on the second reflection surface 143b proceeds to the third reflection surface 145. When the light beam is reflected from the first reflection surface 143a or the second reflection surface 143b and proceeds toward the third reflection surface 145, the scroll direction is reversed as indicated by the arrows in the drawing.

Referring to FIG. 3, the beam shifter 150 may be a refractive optical member 151 having a rectangular shape arranged inclined on the optical axis. The refractive optical member 151 includes an incident surface 151a arranged inclined to an incident optical axis and an exit surface 151b arranged separated a predetermined distance from the incident surface 151a and parallel thereto. The refractive optical member 151 transmits the incident light beam refracted by a difference in the refractive index so as to shift the incident light beam toward the scroll direction change prism 140.

Figure 11:
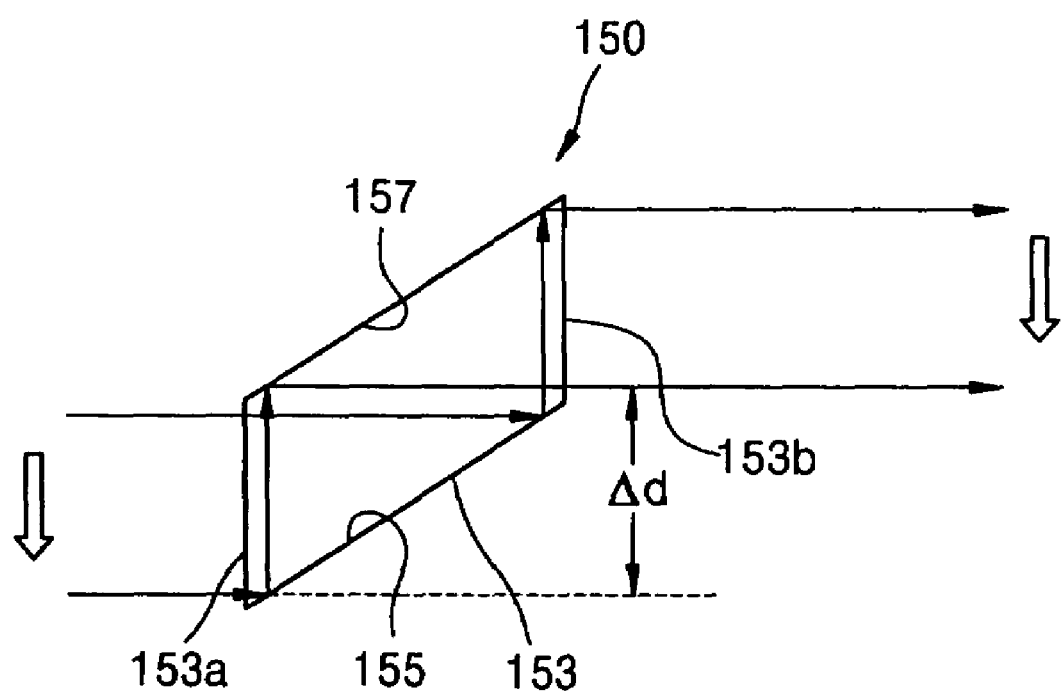
FIG. 11 is a view illustrating a shifter used for the optical combining device of FIG. 3.

Referring to FIG. 11, the beam shifter 150 may be a reflective optical member 153 which shifts an incident light beam by totally reflecting the incident light beam.

The reflective optical member 153 has an incident surface 153a and an exit surface 153b which make a right angle, and first and second reflection surfaces 155 and 157 arranged inclined to the incident optical axis. The height Δd of the incident surface 153a and of the first reflection surface 155 is sufficiently greater than the width of the incident light beam such that a light beam having a scroll direction indicated by a hollow arrow in the drawing can be shifted without a change in the scroll direction.

The fourth relay lens 161 is preferably arranged on the optical axis between the optical combining device 138a and the light valve 165.

Figure 12:
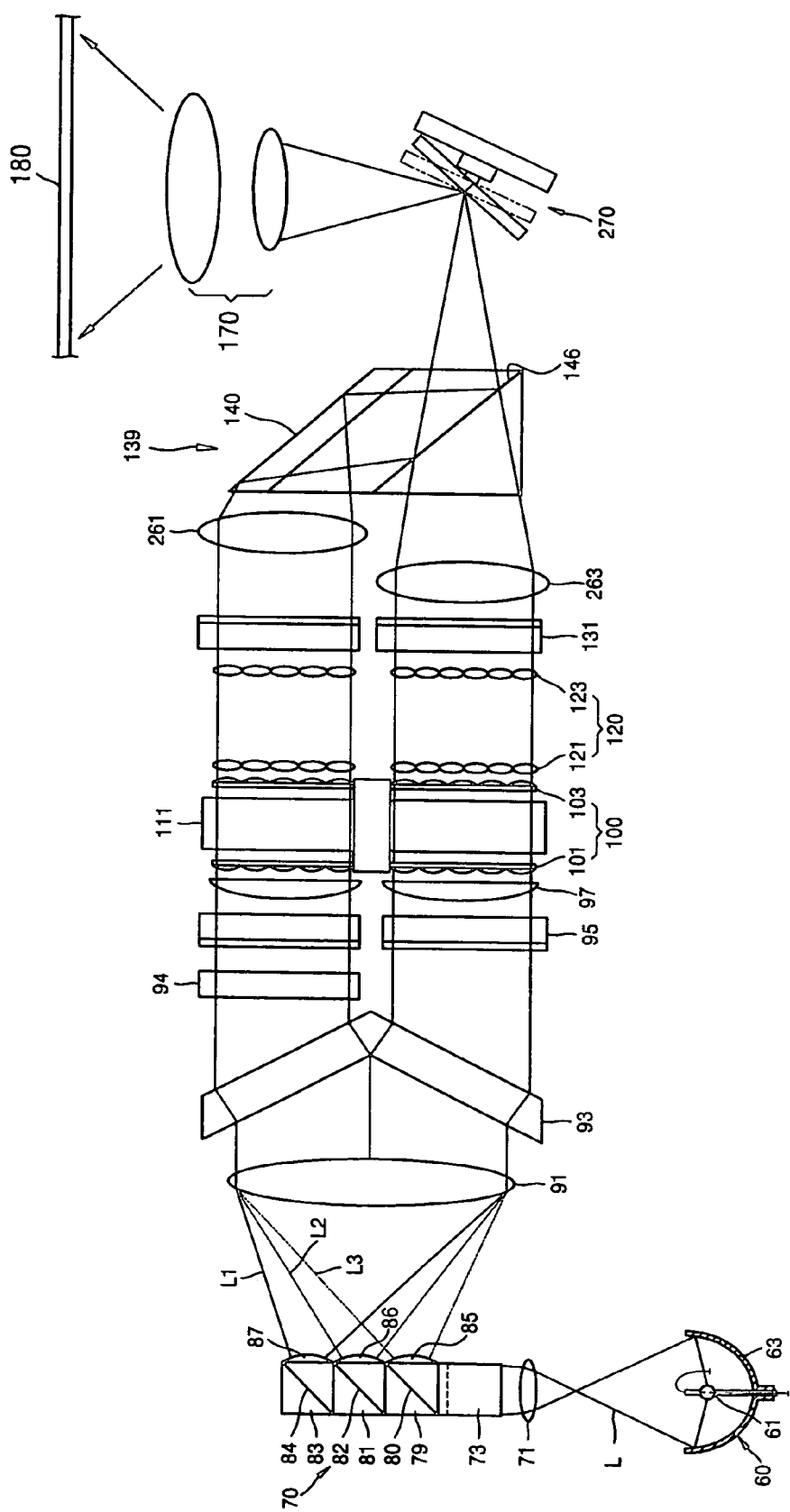
FIG. 12 is a view illustrating a projection system adopting an optical combining device according to a second exemplary embodiment of the present invention.

FIG. 12 shows a projection system adopting an optical combining device according to a second exemplary embodiment of the present invention. In FIG. 12, since the constituent elements having the same reference numerals as those of the constituent elements shown in FIG. 3 have the same structure and operation, detailed descriptions thereof are omitted herein.

Figure 13:
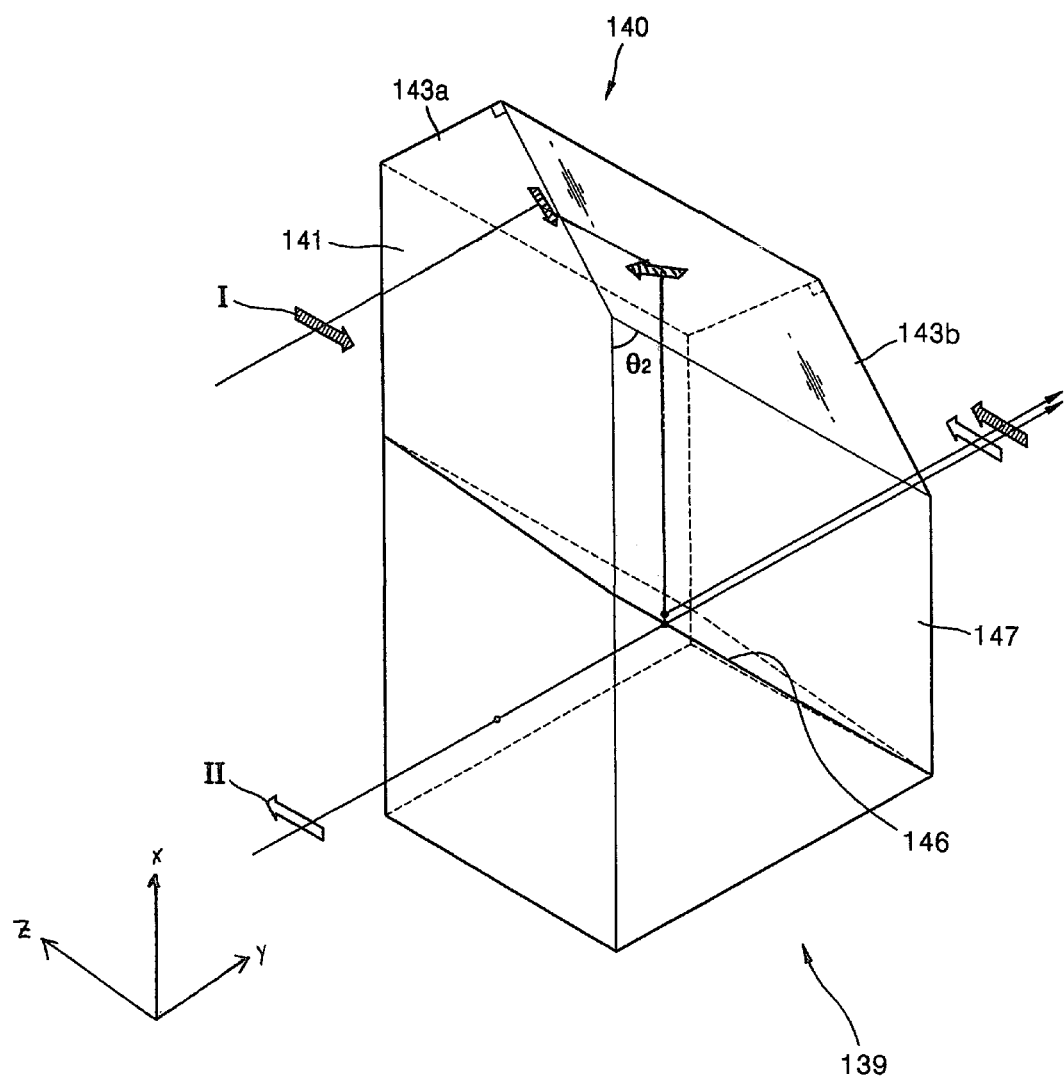
FIG. 13 is a view illustrating the optical combining device of FIG. 12.

The optical combining device 139 according to the second exemplary embodiment of the present invention has a scroll direction change prism 140 and a polarized beam splitter 146. The scroll direction change prism 140, as shown in FIG. 13, includes an incident surface 141 and an exit surface 147, which the first light beam I and the second light beam II proceeding along different optical paths are incident on and exit from, and first and second reflection surfaces 143a and 143b arranged inclined by an angle θ2 from the incident surface 141 toward the exit surface 147. The polarized beam splitter 146 which reflects or transmits the incident light beam according to the polarization direction thereof is provided on the proceed paths of the first and second light beams I and II.

By making the polarization directions of the first and second light beams I and II different, the first light beam I, which is reflected by the first and second reflection surfaces 143a and 143b and has reversed images, is reflected by the polarization beam splitter 146, while the second light beam is transmitted through the polarized beam splitter 146. Thus, both the first and second light beams I and II end up on the same path. In order to make the polarization directions of the first and second light beams I and II different, as shown in FIG. 12, a polarization panel 94 is provided on an optical path of one of the first and second light beams I and II between the beam splitter 93 and the cylindrical lens 95. The polarization panel 94 thus makes the polarization directions of the first and second light beams I and II different from each other.

The first light beam I is reflected by the first and second reflection surfaces 143a and 143b and is incident on the polarized beam splitter 146, with the direction of an image being reversed. The second light beam II is incident on the third polarized beam splitter 146 without a change in the direction of an image. For example, the first light beam I is reflected by the third polarized beam splitter 146 while the second light beam II passes through the third polarized beam splitter 146, so that the first and second light beams I and II proceed along the same path. Thereby, the scroll directions of the first and second light beams become the same.

Fourth relay lenses 261 and 263 are arranged on the proceeding paths of the first and second light beams I and II respectively passed through the first and second effective areas A and B. The fourth relay lenses 261 and 263 are arranged at different positions to compensate for a path difference between the first and second light beams I and II.

As shown in FIGS. 3 and 12, in the projection system adopting the optical combining device according to the present invention, the light beam scrolled by the rotation of the spiral lens disc unit 100 and combined by a optical combining device 138 or 139 is processed by a light valve 165 or 270 according to an image signal to form an image. The light valve 165 may be a single unit of a reflective LCD device a shown in FIG. 3. When the light valve 165 is a reflective LCD device, a beam splitter 163 is provided in front of the light valve 165. Alternatively, as shown in FIG. 12, a micromirror device which generates an image by modulating the scrolled light beam and reflects the generated image in a predetermined direction can be used as the light valve 270. The micromirror device 270 forms an image by varying a reflection path of the incident light beam by driving a micromirror in units of pixel. Since the structure of the micromirror device is well known, a detailed description thereof is omitted herein. The above examples are merely examples of the light valves and two or more units of the reflective LCD devices can be provided.

The image formed by the light valves 165 and 270 is magnified and projected by a projection lens unit 170 onto a screen 180.

As described above, in the optical combining device according to the present invention, by making the light beams proceeding along different optical paths proceed along one path, a system adopting the optical combining device can be made compact. For example, in a projection system, when two areas of the spiral lens disc unit which scroll the color bar are used, the light beams passing through these two areas proceed on the same path and the scroll directions of one of the light beams is reversed, so that the directions which were opposite coincide.

Although the exemplary embodiments of the present invention have been described, it will be understood by those skilled in the art that the present invention should not be limited to the described exemplary embodiments, but that various changes and modifications can be made within the spirit and scope of the present invention. Accordingly, the scope of the present invention is not limited to the described range of the following claims.

The invention claimed is:

1. An optical combining device to make light beams having different polarization directions and proceeding along different paths proceed along the same path, the optical combining device comprising:

a scroll direction change prism which is arranged on a proceeding path of a first light beam of the light beams proceeding along different paths and changes a scroll direction of the first light beam so as to be the same as that of a second light beam proceeding along a different path; and a polarized beam splitter which is provided on a proceeding path of the second light beam having a different polarization from that of the first light beam and makes the first and second light beams proceed along the same path by selectively transmitting or reflecting an incident light beam according to the polarization direction thereof.

2. The optical combining device as claimed in claim 1, wherein the scroll direction change prism comprises:

a first reflection surface which receives and reflects the first light beam; and a second reflection surface which makes a right angle with the first reflection surface and reflects an image of the first light beam reflected by the first reflection surface reversely to proceed toward the polarized beam splitter.

* * * * *